United States Patent [19]

Imanishi et al.

[11] Patent Number: 5,547,432
[45] Date of Patent: Aug. 20, 1996

[54] TOROIDAL-TYPE CONTINUOUSLY VARIABLE TRANSMISSION

[75] Inventors: Takashi Imanishi, Yokohama; Tsutomu Abe, Chigasaki; Hideki Kokubu, Fujisawa, all of Japan

[73] Assignee: Nsk Ltd., Tokyo, Japan

[21] Appl. No.: 358,571

[22] Filed: Dec. 14, 1994

[30] Foreign Application Priority Data

Jan. 24, 1994 [JP] Japan .................................. 6-005997

[51] Int. Cl.$^6$ .......................... F16H 15/38; F16C 19/30; F16C 19/48
[52] U.S. Cl. ................ 476/40; 384/604; 476/46
[58] Field of Search ................... 476/40, 42, 46; 384/604, 608, 619

[56] References Cited

U.S. PATENT DOCUMENTS 4,955,246  9/1990  Nakano .................... 476/46

FOREIGN PATENT DOCUMENTS

62-71465   5/1987  Japan .
1-173552  12/1989  Japan .
2-2555     1/1990  Japan .

Primary Examiner—Allan D. Herrmann
Attorney, Agent, or Firm—Shapiro and Shapiro

[57] ABSTRACT

In order to prevent strong bending stress given to outer rings of thrust ball bearings of power roller assemblies and to improve the durability of the outer rings, a toroidal-type continuously variable transmission has thrust needle bearings which absorb thrust load given to the outer rings as well as allow the outer rings and corresponding trunnions to be shifted from each other. Preferably, the entire circumference of the pitch circle of the balls of each thrust ball bearing overlaps with a load-absorbing region, which is one or more annular and/or arcuate regions having the same width as the needles of needle bearings radially arranged in said regions in order to absorb thrust load.

4 Claims, 8 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used in an automobile and in various kinds of industrial equipment.

2. Related Background Art

Figure 5:
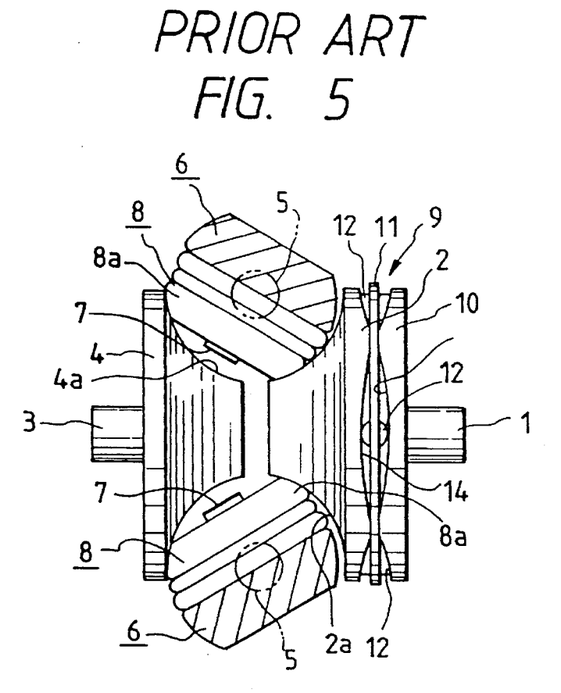
FIG. 5 is a side view schematically showing the fundamental construction of a typical toroidal-type continuously variable transmission in the prior art, which is in the state of maximum deceleration.
Figure 6:
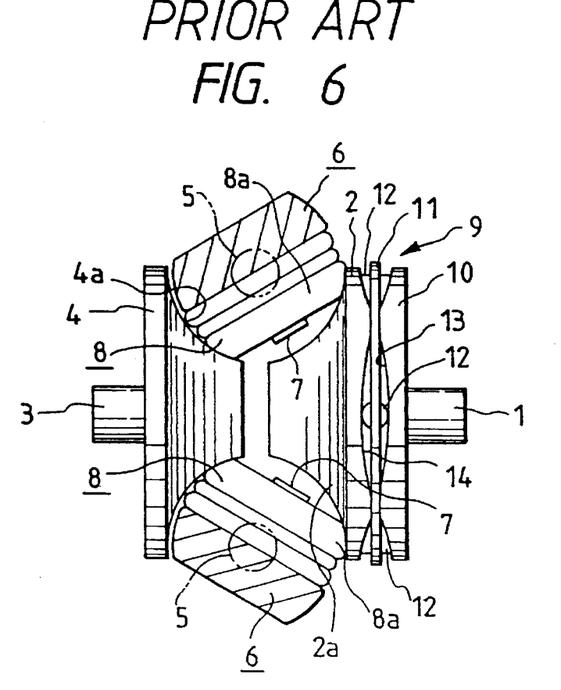
FIG. 6 is a side view showing the same in the state of maximum acceleration.

As a transmission for an automobile, a toroidal-type continuously variable transmission schematically shown in FIGS. 5 and 6 is being studied. As disclosed, for example, in Japanese Utility Model Appln. Laid-Open No. 62-71465, in a typical toroidal-type continuously variable transmission, an input disc 2 is supported coaxially with an input shaft 1 and an output disc 4 is fixed to an end of an output shaft 3 which is arranged coaxially with the input shaft 1. In a housing which contains the toroidal-type continuously variable transmission, trunnions 6 which are rocked around respective pivots 5 are provided. Each pivot 5 is arranged in a skewed position with respect to both the input shaft 1 and the output shaft 3. The pivot 5 of each trunnion 6 has ends that project from the side surfaces of the trunnion 6. Each trunnion 6 has a mobile shaft 7 where base portion is supported at its center. By rocking the trunnions 6 around their respective pivots 5, tilt angles of the mobile shafts 7 can be varied. Each mobile shaft 7 supported by a trunnion 6 rotatably supports a power roller 8, which is held between the input disc 2 and the output disc 4. The inner surface 2a of the input disc 2 and the inner surface 4a of the output disc 4, which face with each other, are concave surfaces of revolution each having a cross-sectional outline containing arcs whose centers coincide with the axes of the pivots 5. Thus spherically shaped peripheral surface 8a of each power roller 8 can fittingly come into contact with the inner surfaces 2a and 4a of the discs 2 and 4.

A loading-cam-type pressure device 9 is provided between the input shaft 1 and the input disc 2 in order to elastically press the input disc 2 toward the output disc 4. This pressure device 9 comprises a cam plate 10 rotated together with the input shaft 1, a holder 11 and plurality of (for example, four) rollers 12. A cam surface 13 which is radially corrugated is formed on one surface (left surface, in FIGS. 5 and 6) of the cam plate 10. A similar cam surface 14 is formed on the outer surface (right surface, in the FIGS. 5 and 6) of the input disc 2. Both cam surfaces 13 and 14 and the holder 11 support said plurality of rollers 12 so that the rollers can roll around axes perpendicular to the axis of the input shaft 1 and rotate around the axis of the input shaft 1.

At the time of operation of the toroidal-type continuously variable transmission having the above-mentioned construction, when the cam plate 10 together with the input shaft 1 is rotated, the cam surface 13 presses the plurality of rollers 12 against the cam surface 14 formed on the outer surface of the input disc 2. As a result, the input disc 2 is pressed against the power rollers 8. At the same time, as the cam surfaces 13 and 14 are engaged with each other via the plurality of rollers 12 in between, the input disc 2 is given torque from the input shaft 1 and is rotated. The torque of the input disc 2, then, is transmitted through the power rollers 8 to the output disc 4. Thus the output shaft fixed to the output disc 4 is rotated.

In order to change the ratio of the rotating speeds of the input shaft 1 and the output shaft 3, trunnions 6 are moved around their respective pivots 5. More specifically, in order to decelerate the automobile, the mobile shafts 7 are tilted as shown in FIG. 5, in which the peripheral surfaces 8a of the power rollers 8 come into contact with the inner surface 2a of the input disc 2 at positions near the center of the input disc 2 as well as with the inner surface 4a of the output disc 4 at positions near the periphery of the output disc 4.

On the other hand, in order to accelerate the automobile, the trunnions 6 are moved around their respective pivots 5 to tilt the mobile shafts 7 as shown in FIG. 6, in which the peripheral surfaces 8a of the power rollers 8 come into contact with the inner surface 2a of the input disc 2 at positions near the periphery of the input disc 2 as well as with the inner surface 4a of the output disc 4 at positions near the center of the output disc 4. When the tilt angles of the mobile shafts 7 are arranged somewhere between the states shown in FIGS. 5 and 6, various ratios of the rotating speed of the input shaft 1 and that of the output shaft 3 can be obtained.

Figure 7:
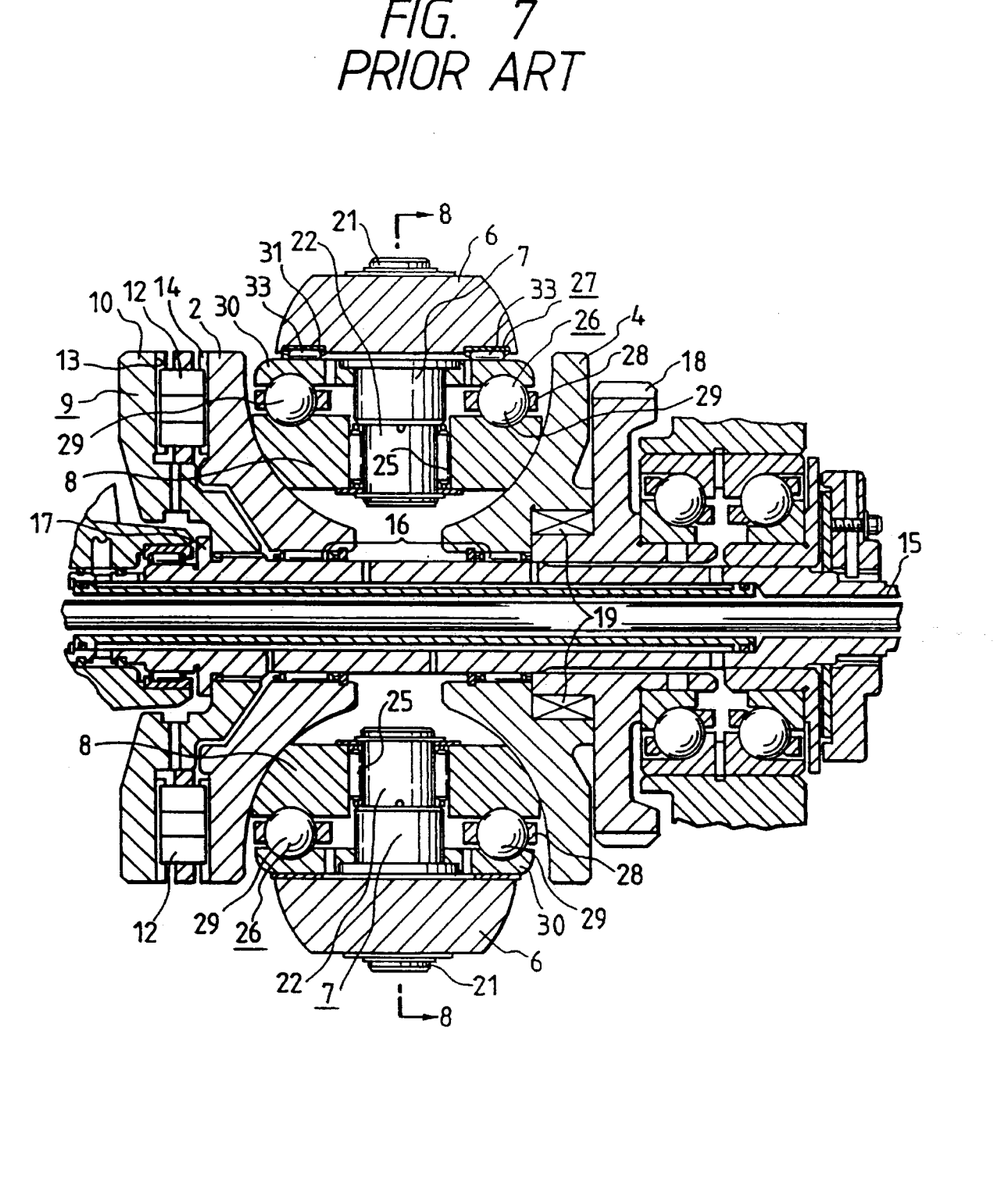
FIG. 7 is a cross-sectional view showing an example of a concrete construction of the toroidal-type continuously variable transmissions in the prior art.

FIGS. 7 to 10 show a more concrete construction of a toroidal-type continuously variable transmission disclosed in microfilms of Japanese Utility Model Appln. No. 63-69293 (Japanese Utility Model Appln. Laid-open No. 1-173552). As shown in FIG. 7, an input disc 2 and an output disc 4 are rotatably supported through respective needle bearings 16 around a tubular input shaft 15. A cam plate 10 having splines is engaged with the splines formed around the outer peripheral surface near an end portion (left end, in FIG. 7) of the input shaft 15, and the cam plate 10 is prevented from shifting leftward and retreating from the input disc 2 by a collar portion 17. A loading-cam-type pressure device 9 for pressing the input disc 2 toward the output disc 4 and transmitting the torque of the input shaft 15 to the input disc 2 to rotate the input disc 2 consists of said cam plate 10 and rollers 12. The output disc 4 is engaged with an output gear 18 through keys 19 so as to be rotated together with the output gear 18.

Figure 8:
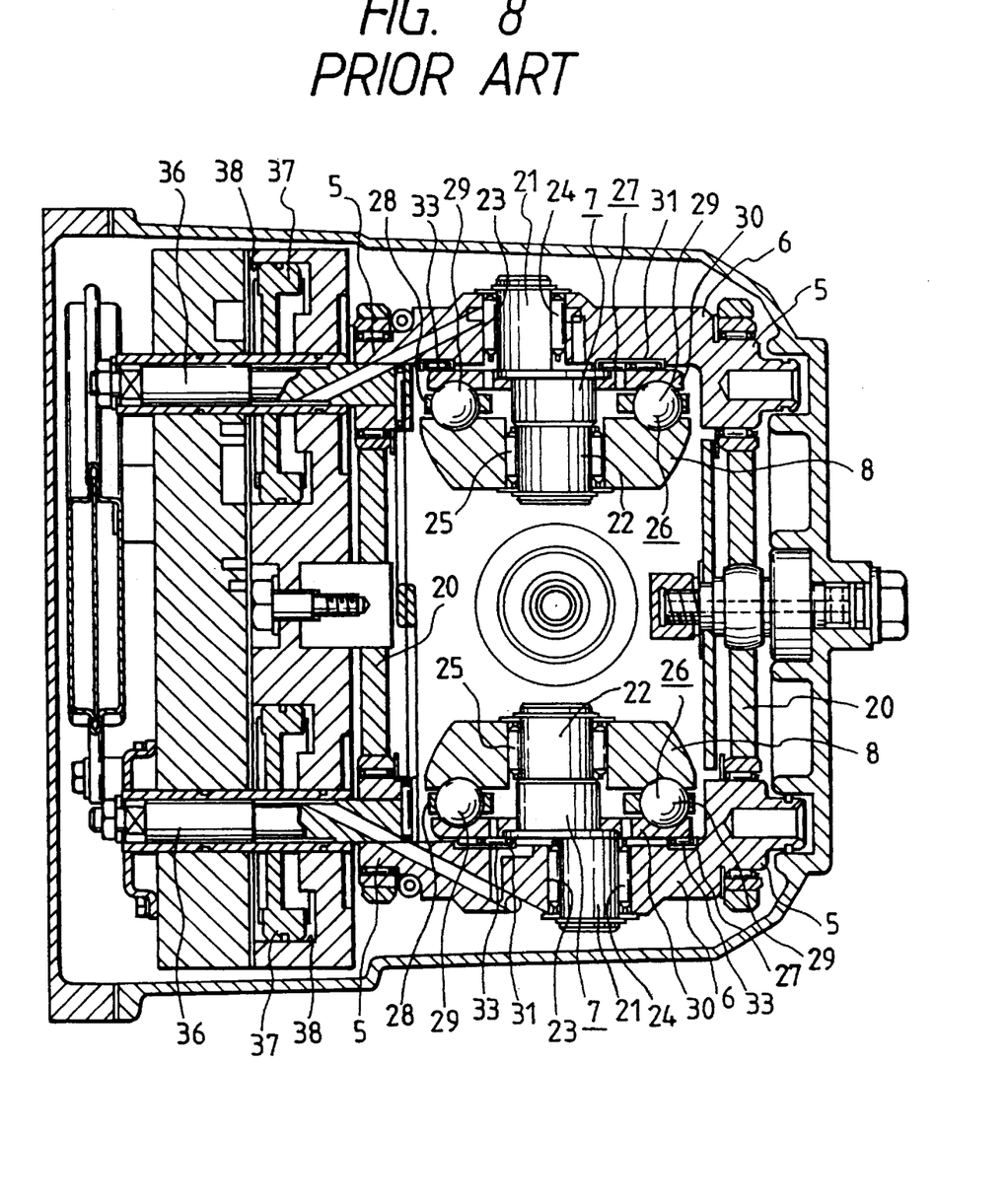
FIG. 8 is a cross-sectional view showing the same, taken along line 8—8 in FIG. 7.

A pair of trunnions 6 is supported by a pair of support plates 20 so that the trunnions can be rocked, and shifted in a direction (which is vertical to the paper of FIG. 7, and is a right-left direction in FIG. 8). A mobile shaft 7 is supported in a round hole 23 formed in the middle of each trunnion 6. Each mobile shaft 7 consists of a support shaft portion 21 and a pivot portion 22, wherein the axes of these portions are parallel to each other and eccentric from each other. Each support shaft portion 21 is rotatably supported by a needle bearing 24 in its corresponding round hole 23. Power rollers 8 are rotatably supported around their respective pivot portions 22 via respective needle bearings 25.

The end faces of the two mobile shafts 7 face to each other and are rotation-symmetrically arranged with respect to the axis of the input shaft 15. The pivot portions 22 of the mobile shafts 7 are eccentric from their respective support shaft portions 21 in the direction toward which the power rollers 8 are pushed by the rotating input and output discs 2 and 4 (horizontally opposite directions in FIG. 8). Each pivot portion 22 deviates from the corresponding support shaft portion 21 along a line whose direction is substantially vertical to that of the axis of the input shaft 15. In this arrangement, the power rollers 8 are supported while allowed to shift a little in the direction of the axis of the input shaft 15. As a result, even if the power rollers 8 are assembled in the apparatus with deviations in the axial directions of the input shaft 15 because of, for example, dimensional inexactitude of the components, excessive stress caused by such deviations can be absorbed without loading it to the components.

Between the outer surface of each power roller 8 and the inner surface of each trunnion 6, a thrust ball bearing 26 and a thrust needle bearing 27 are provided in this sequence from the side of the outer surface of the power roller 8. The thrust ball bearings 26 absorb the load given on the power rollers 8 in the thrust direction, while rotatably supporting the power rollers 8. Each thrust ball bearing 26 consists of plurality of balls 29, an annular holder 28 for holding the balls 29 so that they can roll in the holder 28, and annular outer ring 30. The inner raceway of each thrust ball bearing 26 is formed on the outer surface of the corresponding power roller 8, while the outer raceway of each thrust ball bearing 26 is formed on the inner surface of the corresponding outer ring 30.

Figure 9:
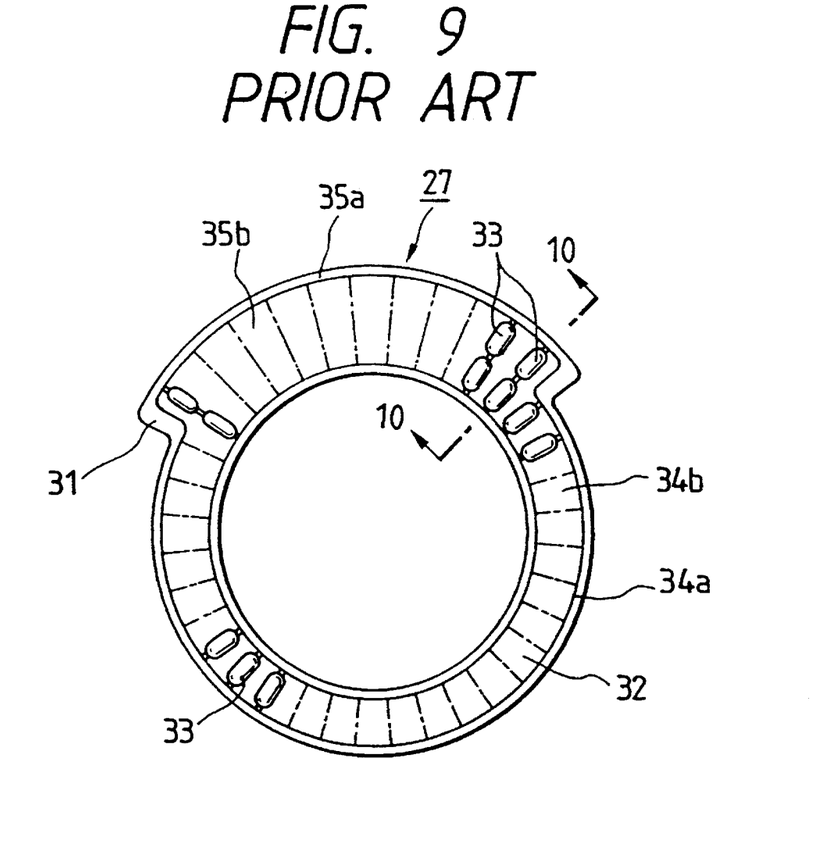
FIG. 9 is a view showing a thrust needle bearing used in a typical conventional construction of the toroidal-type continuously variable transmission, which is seen from the same direction as in FIG. 1.
Figure 10:
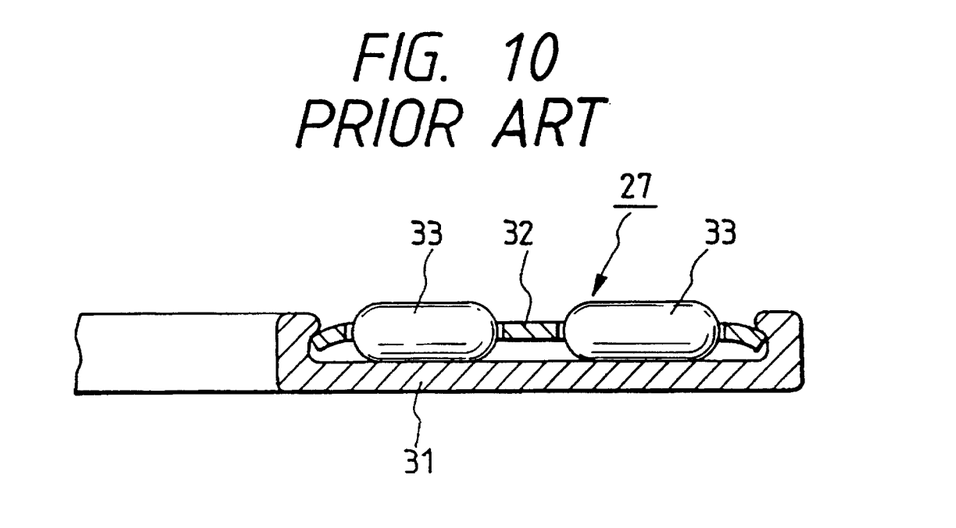
FIG. 10 is an enlarged cross-sectional view showing a part of the thrust needle bearing shown in FIG. 9, and taken along line 10—10 in FIG. 9.

Each thrust needle bearing 27 consists of a race 31, a holder 32 and needles 33, as shown in FIGS. 9 and 10. The race 31 and the holder 32 are assembled so as to shift a little from each other around the circular opening. The race 31 has an annular portion 34a and a protruding portion 35a which radially protrudes from part of the periphery of the annular portion 34a. Similarly, the holder 32 has an annular portion 35b and a protruding portion 34b.

Thus constructed thrust needle bearings 27 are held between the inner surfaces of the trunnions 6 and the outer surfaces of the outer rings 30 with the races 31 in contact with the inner surfaces of the corresponding trunnions 6. The protruding portions 35a and 35b are arranged to be on the side of the pivot portions 22 eccentric from their respective support shaft portions 21. Thus arranged thrust needle bearings 27 absorb thrust loads given from the power rollers 8 to the outer rings 30, while allowing the pivot portions 22 and the outer rings 30 to be rocked around their respective support shaft portions 21.

Further one end portion (lower end portion, in FIG. 8) of each trunnion 6 is connected with a drive rod 36. Drive pistons 37 are fixed to the outer peripheral surfaces of the intermediate parts of respective drive rods 36. These drive pistons 37 are provided inside respective oiltight drive cylinders 38.

In the toroidal-type continuously variable transmission having the above-mentioned construction, the torque of the input shaft 15 is transmitted via the pressure device 9 to the input disc 2. Then, the torque of the input disc 2 is transmitted via the pair of power rollers 8 to the output disc 4. Finally, the torque of the output disc 4 is output via the output gear 18.

In order to change the ratio of the rotating speeds of the input shaft 15 and the output gear 18, said pair of drive pistons 37 are moved in the opposite directions. By moving the driving pistons 37 in this way, said pair of trunnions 6 are rocked in opposite directions around their respective pivots 5 supported by the support plates 20. Accordingly, the directions of the tangential force acting at each contact position of the power rollers 8 and the inner surfaces 2a and 4a of the input and output discs 2 and 4 are changed.

As a result, as shown in FIGS. 5 and 6, the contact positions of the peripheral surfaces 8a of the power rollers 8 and the inner surfaces 2a and 4a of the discs 2 and 4 change to vary the ratio of rotating speeds of the input shaft 15 and the output gear 18.

When the tilt angles of respective mobile shafts 7 are changed in order to vary the ratio of rotating speeds of the input shaft 15 and the output gear 18, the mobile shafts 7 are rocked a little around their support shaft portions 21. At the same time, the outer surface of the outer ring 30 of each thrust ball bearing 26 changes its position with respect to the inner surface of the corresponding trunnion 6. Because of the needle bearing 27 provided between the outer surface of the outer ring 30 and the inner surface of the trunnion 6, only small force is needed to shift the outer ring 30 along on the inner surface of the trunnion 6. In other words, only small force is needed to change the tilt angles of the mobile shafts 7.

As for the toroidal-type continuously variable transmission having the above-mentioned construction and functions, however, the present inventors have found that the durability of the outer ring 30 of the thrust ball bearing 26 is not sufficient and that this problem must be solved in order to practically apply the toroidal-type continuously variable transmission to an automobile. More particularly, the thrust needle bearing 27, which has the race 31 and the holder 32 as shown in FIG. 9 and which is held between the outer surface of the outer ring 30 of the thrust ball bearing 26 and the inner surface of the trunnion 6, cannot effectively absorb the thrust load given to the outer ring 30 through the thrust ball bearing 26.

In other words, the thrust needle bearing 27 used in the conventional toroidal-type continuously variable transmission is effective only for the purpose of smoothing the relative shift between the outer ring 30 and the trunnion 6, and not for the purpose of reinforcing the outer ring 30 against said thrust load. Also, part of the outer ring 30 is not covered with the thrust needle bearing 27 even when the protruding portions 34a and 34b are formed in the race 31 and the holder 32 as shown in FIG. 9. The thrust load given to said uncovered part of the outer ring 30 cannot be absorbed by the needles 33 held in the holder S2.

On the other hand, in the thrust ball bearing 26, the entire periphery of the outer ring 30 receives thrust load from the plurality of balls 29. So the outer ring 30 gets bending stress coming from the thrust load along the border line between the part which is covered with the thrust needle bearing 27 and the uncovered part. When the toroidal-type continuously variable transmission is used in an automobile, the outer rings 30 are repeatedly subjected to very strong bending stress as the plurality of balls 29 rotates around the pivot portions 22. As a result, in a relatively short time the outer rings 30 are damaged. For example, they often get cracked or flaked. Thus, sufficient durability of the toroidal-type continuously variable transmission cannot be obtained.

Figure 11:
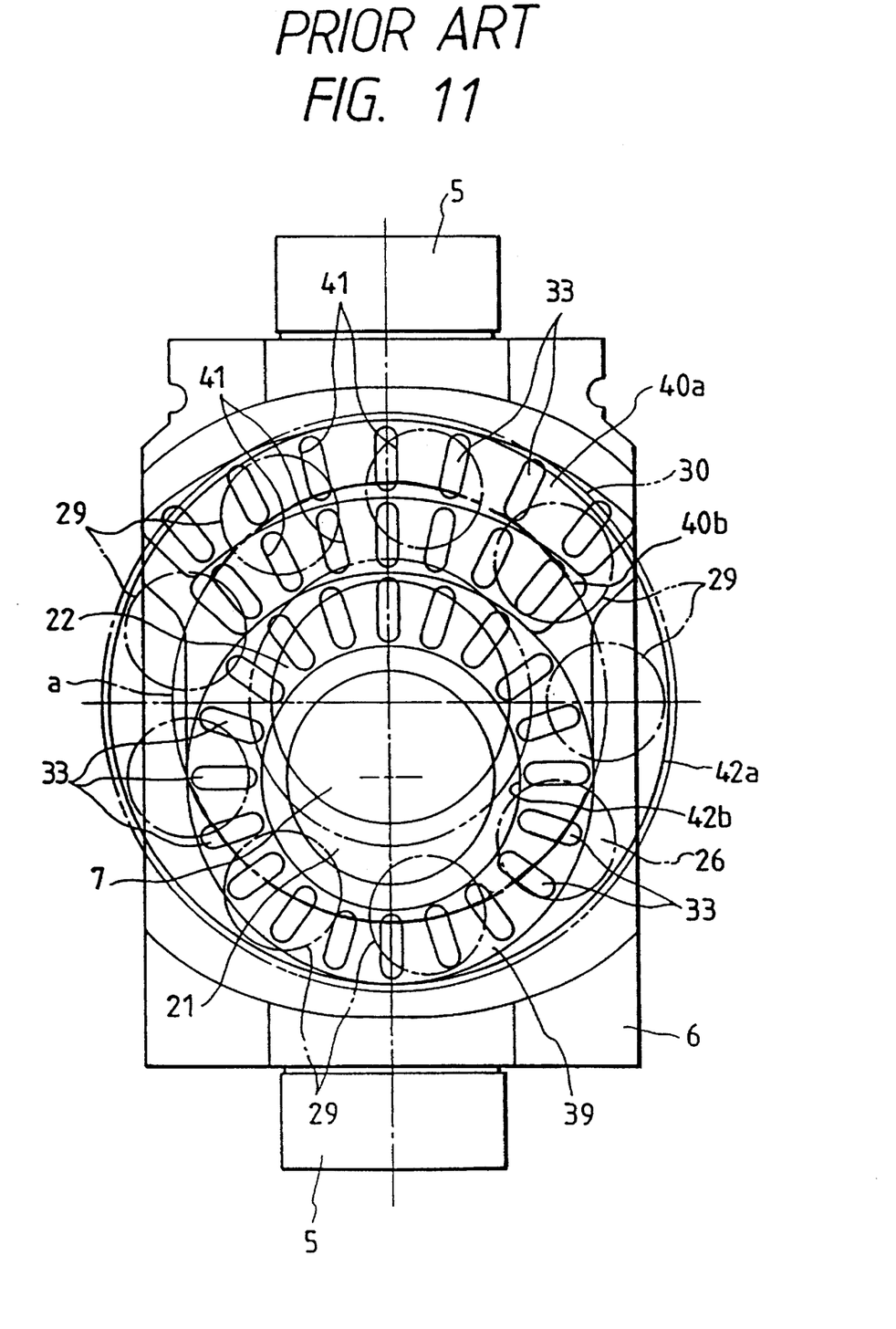
FIG. 11 is a view similar to FIG. 1, but showing a thrust needle bearing which was prepared so as to have a construction similar to that of prior art to be examined in experiments on durability.

The present inventors carried out experiments on the construction employing thrust needle bearings similar to those in the prior art, and found that the outer raceways formed on the inner surfaces of the outer rings 30 could soon be flaked to cause rattle in the thrust ball bearings 26. FIG. 11 shows a thrust needle bearing examined by the inventors, which comprises an arcuate main holder 39, annular auxiliary holders 40a and 40b, and plurality of needles 33 rotatably held in the holders 39, 40a and 40b. The main holder 39 is set around the support shaft portion 21 of the mobile shaft 7, while the auxiliary holders 40a and 40b are arranged corresponding to the pivot portion 22 which is eccentric from the support shaft portion 21.

Two arcuate regions and one annular region which have the same width as the needles 33 and include rows of needles 33 form the genuine load-absorbing region where the thrust load can be absorbed by the needles 33. In the construction shown in FIG. 11, the gap between said two arcuate regions as well as the gap between the arcuate region corresponding to the auxiliary holder 40b and the annular region corresponding to the main holder 39 can be included in said load-absorbing region. About 65% of the entire circumference of a pitch circle a of the thrust ball bearing 26 falls in the load-absorbing region of the thrust needle bearing examined in the experiment when seen from the direction of the axis of the pivot portion 22. In FIG. 11, the part of the circumference falling in the load-absorbing region is indicated by a thicker portion of the broken line, while the other part is indicated by a thinner portion of the broken line.

As a result, it is confirmed that more than 65% of the entire circumference of the pitch circle a of the balls 29 of the thrust ball bearing 26 has to fall in the load-absorbing region to obtain sufficient durability of the outer ring 30.

SUMMARY OF THE INVENTION

The object of the present invention is to provide a toroidal-type continuously variable transmission with good durability without raising the manufacturing cost. The toroidal-type continuously variable transmission according to the present invention, like the above-mentioned conventional toroidal-type continuously variable transmission, comprises: a first disc which is rotatably supported; a second disc which is rotatably supported so as to be coaxial with said first disc and whose inner surface faces to the inner surface of said first disc; trunnions which are rocked around respective pivots each in a skewed position with respect to the axes of the first and second discs; mobile shafts each of which includes of a support shaft portion and a pivot portion parallel with and eccentric from the support shaft portion and each of which is rotatably supported at its support shaft portion by the trunnion with its pivot portion projecting from the inner surface of the trunnion; power rollers which are rotatably supported around the pivot portions and held between the first and second discs; thrust ball bearings set on the outer surfaces of respective power rollers in order to absorb thrust load given to the power rollers while allowing the power rollers to rotate; and thrust needle bearings provided between the outer surfaces of the outer rings of the thrust ball bearings and the inner surfaces of the trunnions in order to absorb thrust load given to the outer rings through the power rollers while allowing the pivot portions and the outer rings to be rocked around the support shaft portions. The inner surfaces of the first and second discs are formed as surfaces of revolution each having a cross-sectional outline including arcuate portions. The peripheral surfaces of the power rollers are spherical. The peripheral surface of each power roller comes into contact with the inner surfaces of the first and second discs. In addition, the toroidal-type continuously variable transmission according to the present invention is designed to satisfy the following two conditions.

(1) At least 70% of the entire circumference, when seen from the direction of the axis of the pivot portion, of the pitch circle of each thrust ball bearing is included in the load-absorbing region where plurality of needles of the thrust needle bearing can absorb the thrust load.

(2) Said plurality of needles in the load-absorbing region covering at least 70% of the entire periphery of the pitch circle of the thrust ball bearing are arranged so that the maximum interval between adjacent needles does not exceed 5% of the entire circumference of the pitch circle of the thrust ball bearing.

The toroidal-type continuously variable transmission according to the present invention which has the above-mentioned construction transmits torque between the rotation shafts and the torque transmission members as well as varies the ratio of the rotating speeds of the rotation shaft and the torque transmission members in the same way as the conventional toroidal-type continuously variable transmission.

Especially in this toroidal-type continuously variable transmission, since a greater part of the outer rings (at least 70% of the entire circumference of the pitch circle) of the thrust ball bearings are reinforced by the needle bearings, the thrust load given to the outer rings does not cause very strong bending stress. As a result, the outer rings cannot be easily damaged. For example, they cannot be easily cracked nor deformed to cause rattle in the thrust ball bearings. Thus, the toroidal-type continuously variable transmission can have good durability.

DESCRIPTION OF THE PREFERRED EMBODIMENTS

Figure 1:
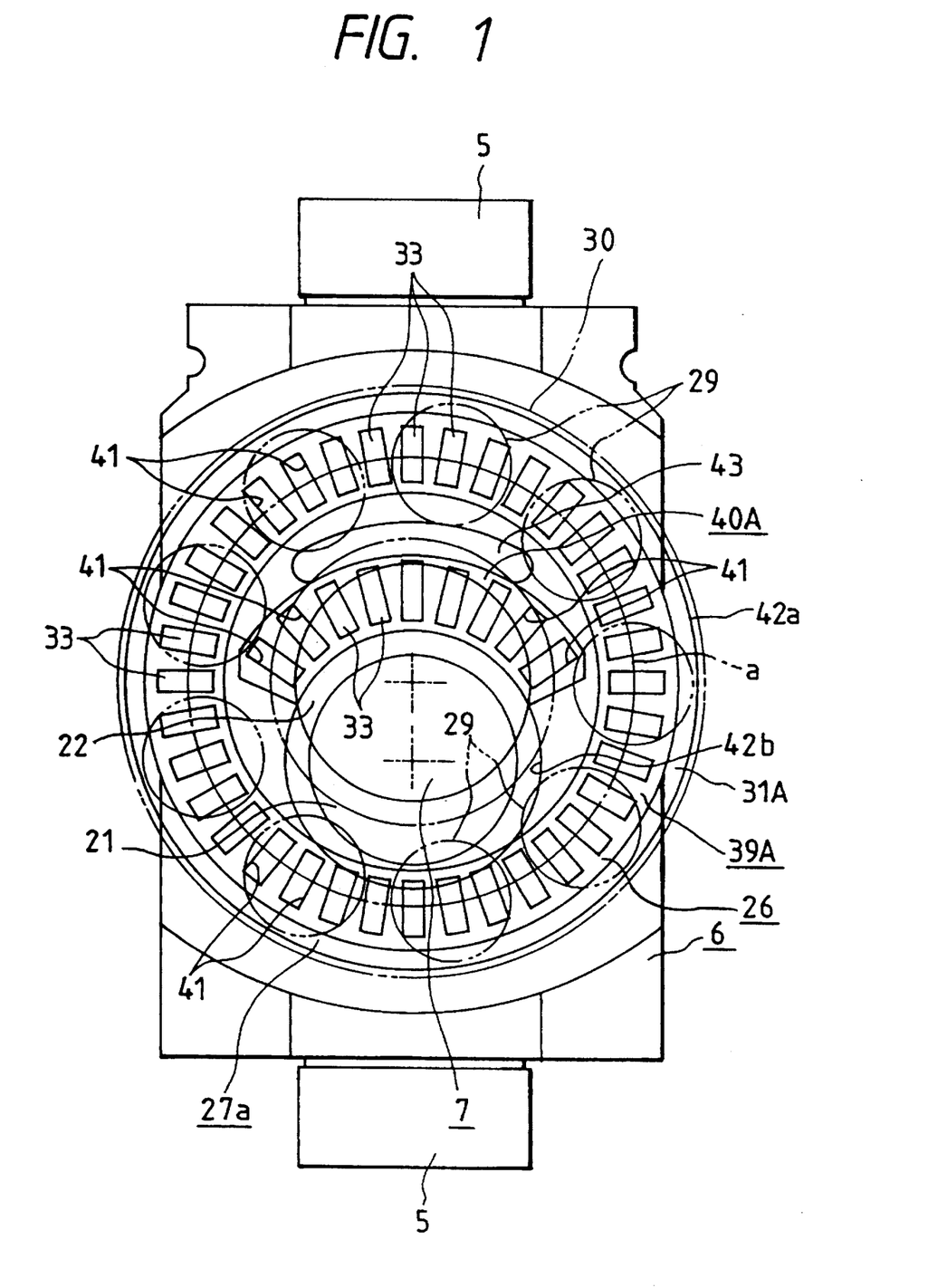
FIG. 1 is a perspective view showing the inner surface of a trunnion of a first embodiment according to the present invention, wherein a thrust ball bearing and a thrust needle bearing are assembled and put to the inner surface of the trunnion.

FIG. 1 shows a first embodiment according to the present invention, in which the structure of a thrust needle bearing 27a held between an outer ring 30 of a thrust ball bearing 26 and the inner surface of a trunnion 6 is designed especially to improve the durability of said outer ring 30. The other components and functions thereof are similar to those of a typical toroidal-type continuously variable transmission, for example, as described before. These similar components will not be described in detail.

The thrust needle bearing 27a of this embodiment consists of an annular main holder 39A and an arcuate auxiliary holder 40A. The diameter of the main holder 39A is designed to be greater than that of the main holder 39 used in the conventional toroidal-type continuously variable transmission shown in FIG. 11. The main holder 39A is set around a pivot portion 22 of a mobile shaft 7.

The annular main holder 39A has many pockets 41 which are radially formed with respect to the axis of the pivot portion 22. Each pocket 41 rotatably supports a needle 33. The maximum interval (pitch) between adjacent needles 33 is determined so as not to exceed 5% of the entire circumference of the pitch circle a of balls 29 of the thrust ball bearing 26.

If the needles 33 are to be arranged at regular intervals, at least 20 needles 33 are required. But it is not necessary to arrange the needles 33 at regular intervals. When the needles 33 are not arranged at regular intervals, the number of needles is determined so that the maximum interval may not exceed 5% of the entire circumference of the pitch circle a of the balls 29 of the thrust ball bearing 26. Generally, 33 to 50 needles 33 are arranged at regular intervals, which are as wide as 2 to 3% of the entire circumference of the pitch circle a.

The annular region having the same width as the needles 33 and including plurality of needles 33 is the genuine load-absorbing region where the thrust load can be absorbed by the needles 33. In this embodiment, the entire circumference that is, 100% of the pitch circle a of the balls 29 of the thrust ball bearing 26 is included in the load absorbing region, as shown in FIG. 1, which is seen from the direction of the axis of the pivot portion 22.

Further, a race 31A made of adamant metal is provided on part of the inner surface of the trunnion 6 so that the needles 33 roll and rotate on the race 31A. The outer periphery 42a of the race 31A is a circle which is substantially coaxial with the pivot portion 22 of the mobile shaft 7, while the inner periphery 42b thereof is a circle substantially coaxial with the support shaft portion 21 of the mobile shaft 7. This race 31A is not necessary if the trunnion 6 itself is made of the adamant metal and has a smooth inner surface.

Unlike the auxiliary holders shown in FIG. 11, the auxiliary holder 40A is provided inside the main holder 39A so that it may be arranged on an arc whose center coincides with the axis of the support shaft portion 21. An arcuate projection member 43 is provided along the outer curved edge of the auxiliary holder 40A. The projection member 43 is also arranged on an arc whose center coincides with the axis of the support shaft portion 21. The auxiliary holder 40A is positioned between the projection member 43 and the peripheral surface of the support shaft portion 21. The needles 33 held in the pockets 41 of the auxiliary holder 40A absorb load given to part of the inner surface of the outer ring 30, more specifically, to the part near the axis of the support shaft portion 21 which corresponds with the pivot portion 22 eccentric from the support shaft portion 21.

At the time of operation of the toroidal-type continuously variable transmission according to the present invention which has the above-mentioned construction, when the power rollers 8 are shifted as the input disc 2 and/or the output disc 4 (see FIGS. 5 to 7) rotate and rattle, the inner surfaces of the trunnions 6 and the outer surfaces of the respective outer rings 30 shift relative to each other. Only small force is required to shift the inner surface of the trunnions 6 and the inner rings 30 because the plurality of needles 33 of the thrust needle bearing 27a roll between the trunnions 6 and the outer rings 30. The deviation of the power rollers 8 with respect to the outer rings 30 is small, so the entire circumference of the pitch circle a remains in the load-absorbing region.

In other words, in this toroidal-type continuously variable transmission according to the present invention, even if the power rollers 8 deviate from the normal positions with respect to their respective outer rings 80, the entire circumference of the pitch circle a of the balls of each outer ring 80 remains in the load-absorbing region. Thus the entire outer surface of each outer ring can be reinforced against the thrust load, and bending stress caused by the thrust load cannot become great. As a result, even if the thrust load is repeatedly given from the power rollers 8 (see FIGS. 5 to 8) through the balls 29 to the outer rings 30, the outer rings 30 cannot be easily cracked nor deformed. Also other damages of the outer rings 30 caused by the thrust load can be prevented. Accordingly, the durability of the outer rings 30, and at the same time that of the toroidal-type continuously variable transmission employing these outer rings 30 can be improved.

Figure 2:
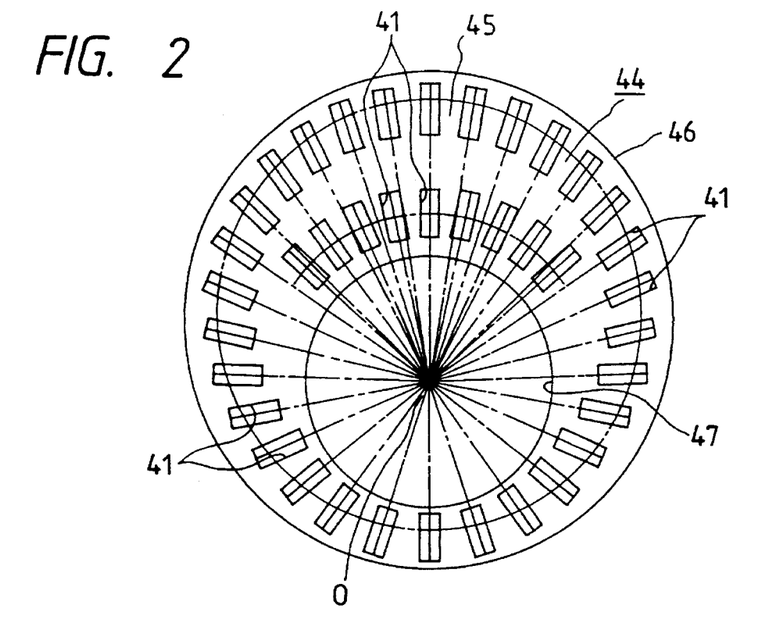
FIG. 2 is a view showing a holder used in the second embodiment, which is seen from the same direction as in FIG. 1.
Figure 3:
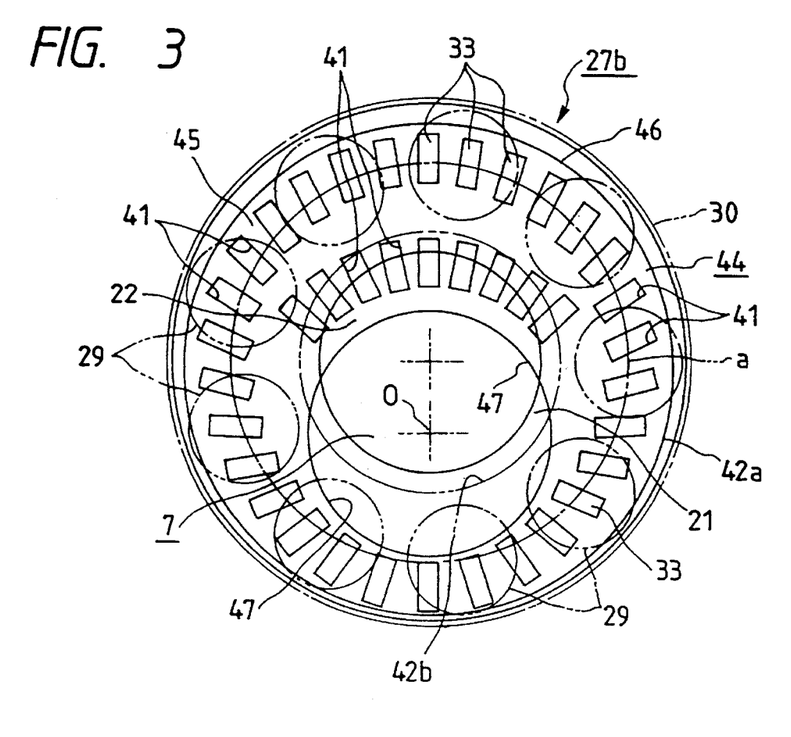
FIG. 3 is a view showing the same holder shown in FIG. 1, wherein a race, a pivot and a thrust ball bearing are assembled with the holder.
Figure 4:
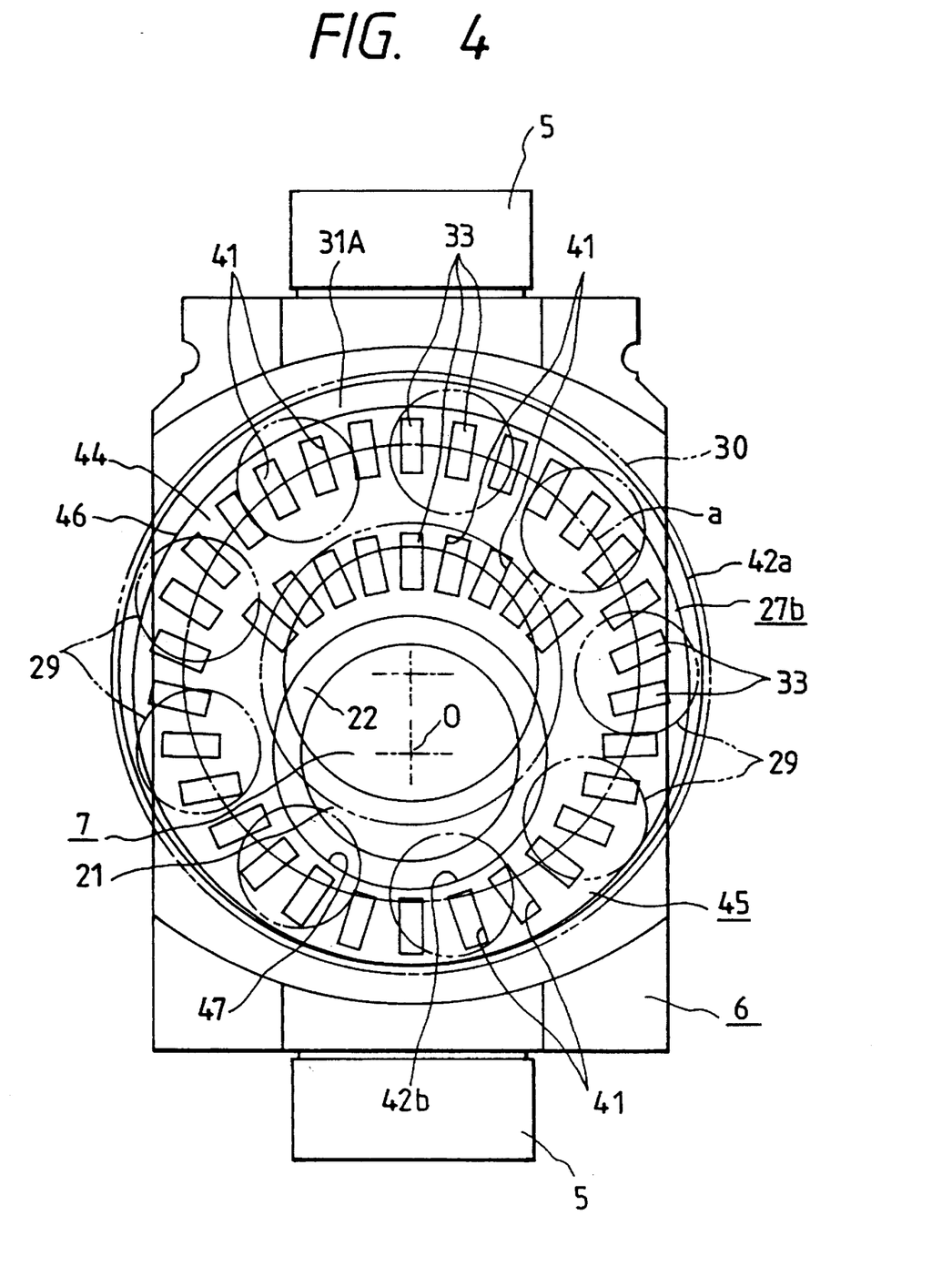
FIG. 4 is a perspective view showing the inner surface of a trunnion of a second embodiment according to the present invention, wherein a thrust ball bearing and a thrust needle bearing are assembled and put to the inner surface of the trunnion.

FIGS. 2 to 4 show a second embodiment according to the present invention. Though the above-mentioned first embodiment uses the thrust needle bearing 27a having two holders, that is, the main holder 39A and the auxiliary holder 40A, this embodiment employs a thrust needle bearing 27b, shown in FIGS. 3 and 4, which has one holder 44 formed in the shape shown in FIG. 2.

The holder 44 is prepared by forming plurality of rectangular pockets in a substrate 45 made of metal, synthetic resin, or other suitable material. When the holder 44 is held between the outer surface of the outer ring 30 of the thrust ball bearing 26 and the inner surface of the trunnion 6, the outer periphery 46 of the holder 44 is positioned so that it is substantially coaxial with the pivot portion 22 of the mobile shaft 7. At the same time, the inner periphery 47 of the holder 44 is positioned so as to be substantially coaxial with the support shaft 21 of the mobile shaft 7.

Further, in this embodiment, the longitudinal direction of each pocket 44 formed in the substrate 45 of the holder 44 is arranged to coincide with a radial direction with respect to a circle whose center is a point O (see FIG. 2), which is coincident with the center of a cross-section of the support shaft portion 21 of the mobile shaft 7. In other words, the rotation axis of each needle held in each pocket 41 coincides with a radial direction of said circle whose center is O.

At the time of operation of the toroidal-type continuously variable transmission having the above-mentioned construction, when the power rollers 8 are shifted as the input disc 2 and the output disc 4 (see FIGS. 5 to 7) rotate and rattle, the outer surfaces of the outer rings 30 and the inner surface of the respective trunnions 6 are shifted relative to each other. In this case, the outer rings 30 are rocked around their respective support shaft portions 22. In this embodiment, the rotation axis of each needle 3 is arranged vertically with respect to the arc along which each outer ring 30 is rocked. Accordingly, unlike the above-mentioned first embodiment, sliding friction is not generated between the rolling contact surfaces of the needles and the outer surface of the outer ring 30 when the outer ring 30 is rocked. In other words, in this embodiment, the contact of the outer surface of the outer ring 30 with respective needles is substantially perfect rolling contact. As a result, the outer surfaces of the outer rings 30 and the inner surfaces of the trunnions 6 are more smoothly shifted relative to each other than in the above-mentioned first embodiment.

Note that a necessary condition of the toroidal-type continuously variable transmissions according to the present invention is that at least 70% of the entire circumference of the pitch circle a of the balls 29 of each thrust ball bearing 26 should overlap with the load-absorbing region. It is not necessary for the load-absorbing region to include the entire circumference of the pitch circle a. It is true that the greater the part of the circumference of the pitch circle a which is included in the load-absorbing region, the further the durability of the toroidal-type continuously variable transmission is improved. But when at least 70% of the circumference is included in the load-absorbing region, much better durability can be obtained than that of the conventional toroidal-type continuously variable transmission. The maximum interval between adjacent needles 33 of the thrust needle bearing 27a or 27b must not exceed 5% of the circumference of the pitch circle a in the load-absorbing region. As long as at least 70% of the entire circumference of the pitch circle a is included in the load-absorbing region, even if the intervals between adjacent needles exceed 5% of the circumference in the region corresponding to the rest (less than 30%) of the pitch circle a which is not included in the load-absorbing region, better durability can be obtained than the conventional apparatus. Preferably, all the intervals between adjacent needles do not exceed 5% of the circumference of the pitch circle a.

As the toroidal-type continuously variable transmissions according to the present invention having the above-mentioned constructions and functions employ the outer rings of the thrust ball bearings having better durability, the durability of the toroidal-type continuously variable transmissions and reliability thereof can be improved.

What is claimed is:

1. A toroidal-type continuously variable transmission, comprising:

a first disc which is rotatably supported; a second disc which is rotatably supported so as to be coaxial with said first disc and having an inner surface that faces an inner surface of said first disc; trunnions which are rocked around corresponding pivots transverse to the axes of the first and second discs; mobile shafts each of which includes a support shaft portion and a pivot portion parallel with and eccentric with respect to the support shaft portion and each of which is rotatably supported at its support shaft portion by a corresponding one of the trunnions, with its pivot portion projecting from an inner surface of the trunnion; power rollers each of which is rotatably supported around a corresponding one of the pivot portions and held between the first and second discs; thrust ball bearings each of which is set on an outer surface of a corresponding one of the power rollers in order to absorb thrust load given to the power roller while allowing the power roller to rotate; and thrust needle bearings each provided between an outer surface of the outer ring of a corresponding one of the thrust ball bearings and the inner surface of the corresponding trunnion in order to absorb thrust load given from the power roller and the outer ring, whereby the pivot portions and the outer rings can be rocked around the corresponding support shaft portions, wherein the inner surfaces of the first and second discs are formed to be surfaces of revolution each having a cross-sectional outline including an arcuate portion, the peripheral surfaces of the power rollers are spherical, the peripheral surface of each power roller comes into contact with the inner surfaces of the first and second discs, and wherein the following two conditions are satisfied:

(1) at least 70% of the entire circumference of a pitch circle of each thrust ball bearing, as seen in an axial direction of the corresponding pivot portion, is included in a load-absorbing region where a plurality of needles of the corresponding thrust needle bearing can absorb the thrust load; and (2) a maximum interval between adjacent needles in said load-absorbing region does not exceed 5% of the entire circumference of said pitch circle.

2. A toroidal-type continuously variable transmission according to claim 1, wherein the respective pluralities of needles of the thrust needle bearings are arranged along arcs whose centers coincide with the axes of the pivot portions of the corresponding mobile shafts.

3. A toroidal-type continuously variable transmission according to claim 1, wherein the rotation axis of each needle is arranged radially with respect to a circle whose center coincides with that of a circular cross-section of the support shaft portion of the corresponding mobile shaft.

4. A toroidal-type continuously variable transmission according to claim 2, wherein the rotation axis of each needle is arranged radially with respect to a circle whose center coincides with that of a circular cross-section of the support shaft portion of the corresponding mobile shaft.

* * * * *